Dec. 22, 1970 G. I. ACOSTA ET AL 3,548,527

GREETING CARD WITH PIVOTED REAR PANEL

Filed June 13, 1968 2 Sheets-Sheet 1

Gabriel Isaac Acosta
Gonzalo Acosta C.
INVENTORS

Dec. 22, 1970   G. I. ACOSTA ET AL   3,548,527
GREETING CARD WITH PIVOTED REAR PANEL
Filed June 13, 1968   2 Sheets-Sheet 2

Gabriel Isaac Acosta
Gonzalo Acosta C.
INVENTORS

BY *Clarence A. O'Brien*
*and Harvey B. Jackson*
Attorneys

United States Patent Office 3,548,527
Patented Dec. 22, 1970

3,548,527
GREETING CARD WITH PIVOTED REAR PANEL
Gabriel I. Acosto and Gonzalo Acosta C., both of Dr.
Lucio 55 Y 59, Xalapa, Vera Cruz, Mexico
Filed June 13, 1968, Ser. No. 736,791
Int. Cl. G09f 1/12
U.S. Cl. 40—152.1                          6 Claims

ABSTRACT OF THE DISCLOSURE

A framed card which may be used for greetings, touristic trade, cultural education, decorations, publicity and the like to display photographs in a much more attractive and artistic manner, which photographs may be changed easily in this card frame, and which through the arbitrary position, slanting and partly projecting, of the frame which is protected by a transparent film or glass sheet, from a distance produces the optical effect which is increased by the ambient light which must penetrate through the upper portion between the picture and the frame, giving an impression of depth to the picture, as well as the appearance of a lighted transparency.

---

Until the present invention, it has not been possible to obtain the optical effect afforded by the invention which consists in placing a photograph in the card frame, either a color or a black and white photograph which gives the photograph a remarkable effect of depth, approximately three-dimensional, with the necessity of special lenses or filters to observe it. Additionally, the photograph acquires a light effect which imitates a lighted transparency. The present invention will be manufactured so that post cards, photographs or the like may be easily inserted into the card frame thereby retaining the cost of the invention at a desired minimum.

The invention is not limited exclusively to the display of opaque photographs, cards, printed photographs, paintings or the like but also covers transparencies or projections which are placed in flat position in the card frame to give an impression of distance through the slanting and semi-projecting position and contrast of the frame with the picture.

The present invention may be constructed in various sizes with the frame being made of various material such as cardboard, wood, plastics and the like with the frame preferably being tray shaped although any desired shape and configuration of frame may be employed.

Essentially, the present invention consists of placing a post card or photograph in a slanting position when it rests on a portion of the back of the frame which has been oriented in the desired position. The effect of depth is obtained only through optical illusion and the device is quite simple, easy to handle and employed with various photographs or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
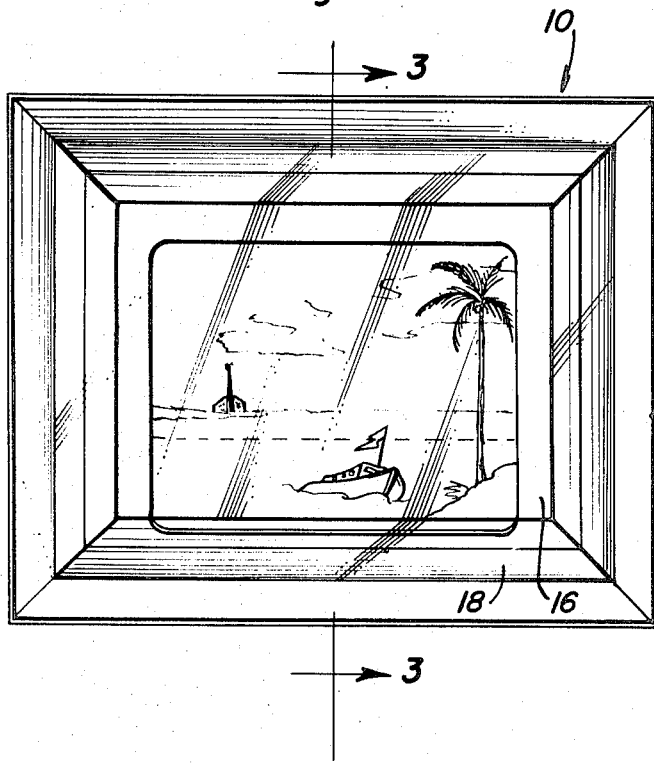
FIG. 1 is a front plan view of the card frame with a photograph or card supported therein.

Referring to these drawings, the numeral 10 generally designates the card frame and assembly associated therewith which includes a tray-like structure having a rear panel 12 and forwardly and outwardly inclined side edge panels 14. The meeting corners of the flanges 14 are mitered and secured together in any suitable manner. Disposed in overlying parallel relation to the rear panel 12 is a transparent front panel 16 supported from the flanges 14 by inwardly inclined transparent flanges 18 which are inclined forwardly and rearwardly with the mitered corners thereof being secured together in any suitable manner thus forming a rear panel with a transparent front panel in spaced parallel relation thereto with the flanges 14 and 18 defining a picture frame or card frame.

Figure 3:
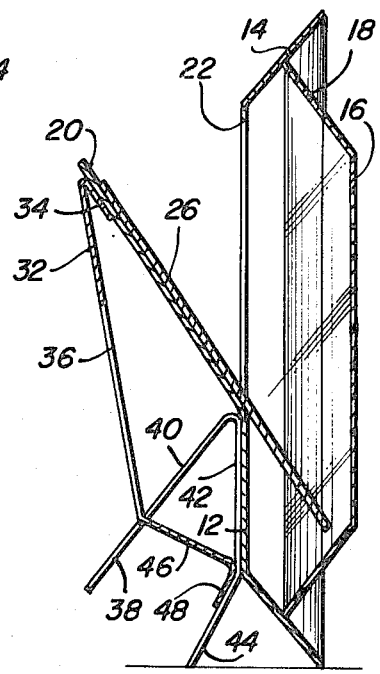
FIG. 3 is a vertical sectional view taken substantially upon a plane passing along section line 3—3 of FIG. 1 illustrating the structural details thereof.
Figure 2:
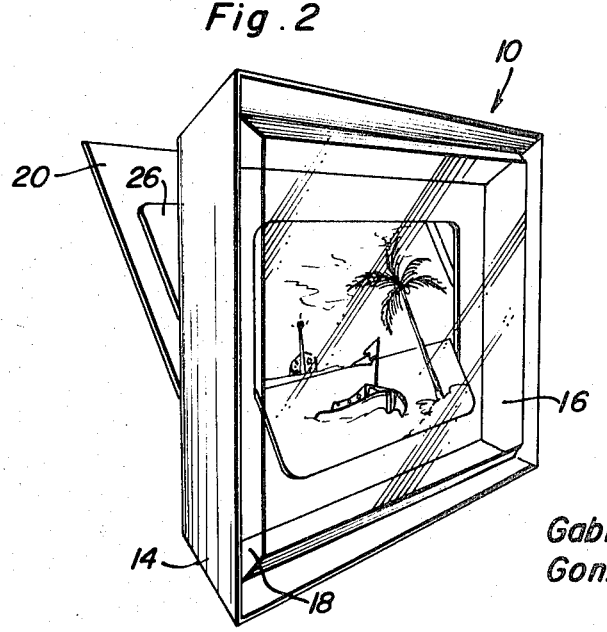
FIG. 2 is a perspective view of the invention.
Figure 4:
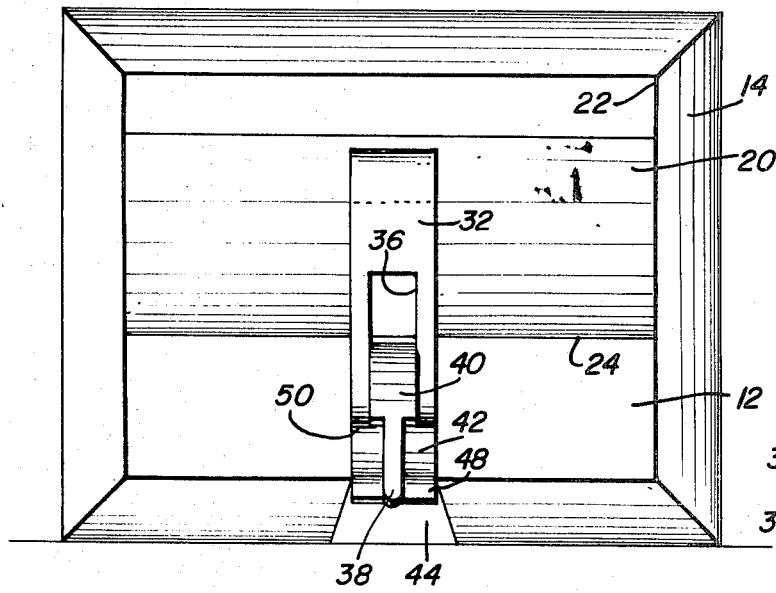
FIG. 4 is a rear view of the invention.
Figure 5:
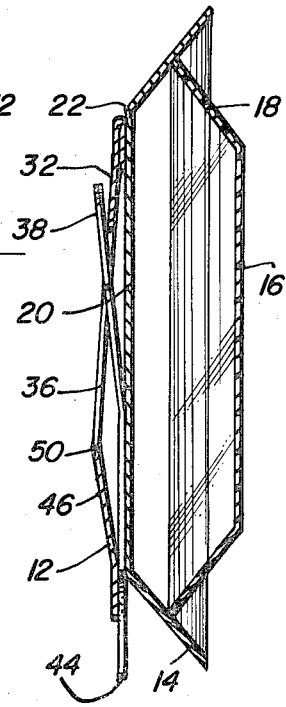
FIG. 5 is a vertical sectional view of the structure of FIG. 4.
Figure 6:
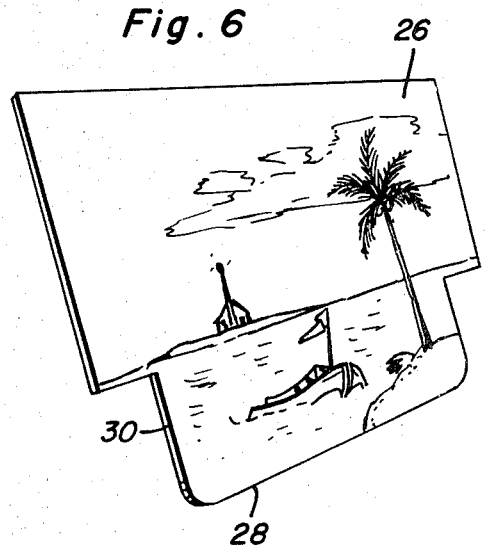
FIG. 6 is a perspective view of a post card or photograph employed with the invention.

A rear supporting panel 20 is disposed in alignment with an enlarged opening 22 formed in the rear panel 12 and will normally form a closure therefor when the rear supporting panel 20 is disposed alongside of or against the rear surface of the panel 12 as illustrated in FIG. 5. The bottom edge of the rear supporting panel 20 is hingedly attached to the lower edge of the opening 22 as along hinge line 24 so that the rear supporting panel 20 may be oriented in rearwardly inclined position as compared with the rear panel 12 as illustrated in FIG. 3 for supporting a photograph or post card 26 which has a projecting bottom edge 28 defined by a pair of parallel side edges 30 spaced inwardly from the side edges of the photograph or post card so that the projecting edge 28 is generally in the form of a tongue for insertion through the lower portion of the opening 22 so that it will terminate adjacent the interior surface of the front transparent member 16 as illustrated in FIG. 3.

Attached to the rear edge of the supporting panel 20 adjacent the free upper edge thereof, there is a strap 32 of cardboard or similar material having the upper end thereof inturned as at 34 and fastened to the supporting panel 20 adjacent the upper center thereof. The strap 32 extends downwardly and has an elongated slot 36 formed centrally therein for receiving a projecting tongue 38 on a locking tab 40 which has a main portion 42 secured to the rear surface of the rear panel 12 below the hinge line 24. The terminal end of the strap 42 extends downwardly beyond the bottom edge of the rear panel 12 and in diverging relation to the bottom flange 14 as indicated at 44 thus forming a support for the card frame 10 to retain it in vertical position. The strap 32 has its lower end extending inwardly as at 46 and anchored to the strap 42 as at 48. The tongue 38 is relatively narrow as compared with the strap 40 and extends through the slot 36 with the shoulder edges defined by the wider strap 40 where it joins with the tongue 38 engaging the lower end of the slot 36 at a foldline 50 thus serving to retain the inclined support panel 20 in the rearwardly inclined position as illustrated in FIG. 3 when the tongue 38 is grasped and pulled downwardly from the position illustrated in FIG. 5 until it reaches the position illustrated in FIG. 3.

The frame may be supported in a vertical position on top of furniture or the like thus giving an impression of depth to the picture and an impression of reality and light which has not been obtained in cards of this type. The projecting portion of the card penetrates the vertical plane of the rear panel 12 to effectively support the card and to have the lower edge thereof terminate closely adjacent the transparent cover 16. With the card supported in an inclined plane which contrasts with the frame, it will produce the desired effect, since when the card is lighted by lateral zenith light, it produces the optical illusion phenomena which gives it an impression of depth and light.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is as follows:

1. A frame which may be made of various materials and in various dimensions, in which the central portion has the form of a rectangle and is cut at three of its sides, one of said sides remaining affixed, thus permitting a hinging action when said part is folded back, remaining under the form of an inclined flap, a photograph placed on said flap for display, said photograph having a projection of reduced width which projects forwardly of the portion of the frame to which the flap is affixed when the flap is rearwardly inclined and which rests against the front surface of the frame when the flap is positioned in substantially the same plane as the frame.

2. The structure as defined in claim 1 wherein the periphery of the frame includes forwardly extending inclined flanges, and a transparent film attached to said flanges in spaced relation to the displayed photograph.

3. The structure as defined in claim 1 wherein the flap is provided with a normally straight strap, and means extending between the frame and strap to angulate the strap thus, retaining the flap in rearwardly inclined relation.

4. The structure as defined in claim 3 wherein the periphery of the frame includes forwardly extending inclined flanges, and a transparent film attached to said flange in spaced relation to the displayed photograph.

5. The structure as defined in claim 3 wherein the lower edge of the frame is provided with a depending tab, the lower end of said strap being connected with the tab and pulling the tab rearwardly when the strap is angulated whereby the tab supports the frame in generally an upright position.

6. The structure as defined in claim 5 in which the photograph extends beyond the periphery of the opening defined in the frame to enable observation of the peripheral portions thereof rather than peripheral portions of the flap when the flap is oriented in rearwardly inclined relation.

References Cited

UNITED STATES PATENTS

| | | | |
|---|---|---|---|
| 2,220,262 | 11/1940 | Miller | 40—152.2 |
| 3,355,828 | 12/1967 | Betz | 40—152.1 |

EUGENE R. CAPOZIO, Primary Examiner

W. J. CONTRERAS, Assistant Examiner